(No Model.)

C. P. HANSON.
CHECK ROWER AND PLANTER.

No. 270,428. Patented Jan. 9, 1883.

Witnesses:
Philip L. Masi.
E. H. Bates

Inventor:
Chas. P. Hanson
by Anderson & Smith
his Attorneys.

UNITED STATES PATENT OFFICE.

CHARLES P. HANSON, OF EDWARDSBURG, MICHIGAN.

CHECK-ROWER AND PLANTER.

SPECIFICATION forming part of Letters Patent No. 270,428, dated January 9, 1883.

Application filed July 8, 1882. (No model.)

*To all whom it may concern:*

Be it known that I, CHARLES P. HANSON, a citizen of the United States, and a resident of Edwardsburg, in the county of Cass and State of Michigan, have invented a new and valuable Improvement in Check-Rowers and Planters; and I do hereby declare that the following is a full, clear, and exact description of the construction and operation of the same, reference being had to the annexed drawings, making a part of this specification, and to the letters and figures of reference marked thereon.

Figure 1:
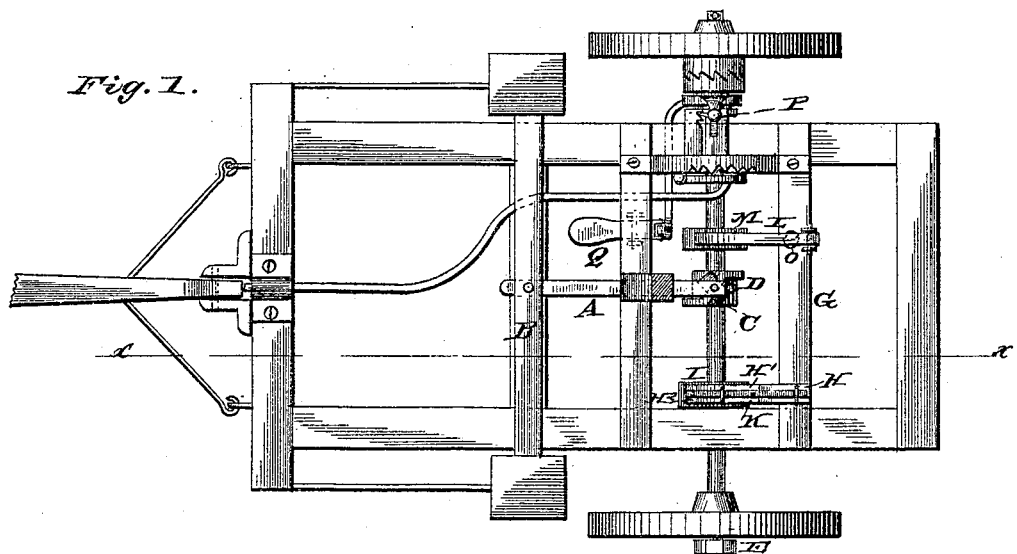
Figure 2:
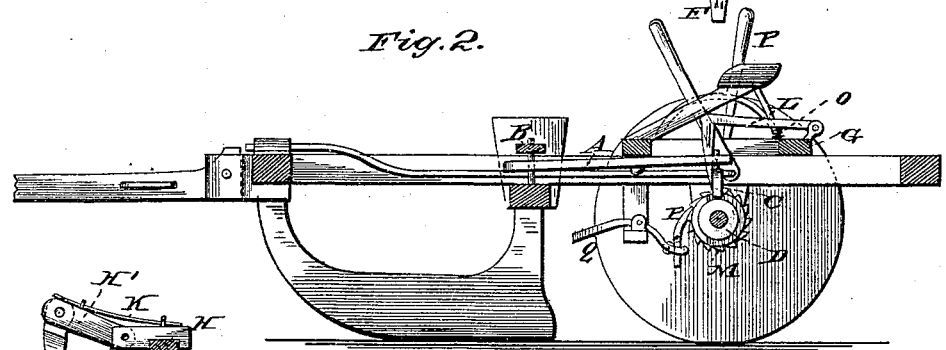
Figure 5:
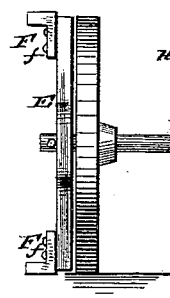
Figures 3, 6:
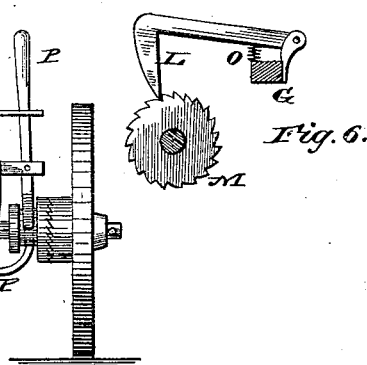
Figure 4:
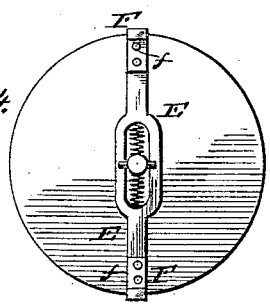

Figure 1 of the drawings is a top or plan view of my check-rower and planter. Fig. 2 is a vertical sectional view of the same. Fig. 3 is a rear view; and Figs. 4, 5, and 6 are detail views of the several operating parts.

This invention relates to an improvement on the check-row planter secured to me by Letters Patent of the United States numbered 248,457 and dated October 18, 1881.

The objects of my present improvement are to provide a novel device for setting the axle, so as to properly time the movements of the seed-slide; also, to improve the construction of the lever for actuating the seed-slide, and to provide means for holding the axle when the wheel carrying the clutch runs up and over a rock or other obstacle, or runs in and out of an old furrow or depression in the ground, whereby the slide will not be actuated so as to allow the seed to drop at irregular intervals.

This machine is provided with the devices for depressing the tongue so as to vary the depth of penetration of the openers. It is further provided with the device for checking off the hills, the clutch for holding one of the wheels rigid with the axle, or for releasing the wheel, the device for operating said clutch, the seed-boxes and seed-slide, and a pivoted lever for actuating said slide, all constructed substantially as shown in my said patent. Description thereof is therefore not necessary, with the exception that the lever A, which actuates the seed-slide B, has at its rear end a pivoted yoke, C, which embraces the cam-rib on wheel D, whereas in my said patent the yoke is not shown; also, the bar E, for checking off the hills, is provided at its ends with the angular-shaped feet or steppers F, adjustably connected to the bar by means of pins *f*, passing through openings in the said feet.

As a means for turning the axle at the start, so as to properly adjust the seed-slide-actuating devices, I secure to the cross-bar G, which is in rear of the driver's seat, a block, H, and in the forward end of said block pivot a lever, H', carrying a pawl, H², adapted to engage a ratchet-wheel, I, upon the axle. A flat spring, K, is secured to said block and lever, so as to normally raise the latter and adjust the pawl by pressing on the same.

In operating this device the driver can depress the lever with his foot, so as to cause the pawl to act on the ratchet, and thus turn the axle.

The device for holding the axle consists of a hook, L, hinged to or pivoted upon the cross-bar G at the right side of the driver's seat. This hook is normally raised from a ratchet-wheel, M, on the axle by means of a spring, O, which can be either a coiled spring arranged between the shank of the hook and the cross-bar G, or it can be held up by a spring similar to the spring employed in connection with the lever for adjusting the axle and seed-slide-operating devices. In operating this hook the driver will depress the hook with his right foot, so that it will engage the ratchet, and thereby hold the axle until the proper moment arrives for releasing the same. In this way the seed can under all circumstances be allowed to drop at regular intervals.

The appliance for clutching or unclutching the axle and one of the wheels is the same as that shown in said patent, with the exception that the lever P is bent down and connected with a lever or treadle, Q, pivoted to the cross-bar of the main frame, and arranged to be depressed by the right foot of the driver.

A lever for arresting the motion of the axle is not new in this connection, and is not broadly claimed herein.

Having thus described my invention, what I claim is—

1. In a check-rower and planter, the combination, with the ratchet-wheel I, fixed upon the axle, of the block H, secured to the cross-bar G in rear of the driver's seat, and provided with the lever H', spring K, and pawl H², substantially as specified.

2. The combination, with a ratchet-wheel fixed upon the axle, of the spring-hook L, pivoted to the bar G, provided with the spring O, and adapted to engage the said ratchet, and thereby hold the axle while the machine is being drawn forward, substantially as described.

In testimony that I claim the above I have hereunto subscribed my name in the presence of two witnesses.

CHAS. PERRY HANSON.

Witnesses:
  A. I. CURTIS,
  MOSES H. LEE.